United States Patent
Miyamoto et al.

[11] Patent Number: 5,936,933
[45] Date of Patent: Aug. 10, 1999

[54] INFORMATION RECORDING MEDIUM AND METHOD AND APPARATUS FOR RECORDING AND REPRODUCING INFORMATION USING THE SAME

[75] Inventors: Harukazu Miyamoto, Kodaira; Yoshio Suzuki, Fujisawa; Motoyuki Suzuki, Yokohama; Hisataka Sugiyama, Kodaira; Hiroyuki Minemura, Yokohama; Tetsuya Fushimi, Chigasaki; Nobuhiro Tokushuku, Yokohama, all of Japan

[73] Assignee: Hitachi Ltd., Tokyo, Japan

[21] Appl. No.: 08/900,294

[22] Filed: Jul. 25, 1997

[30] Foreign Application Priority Data

Jul. 26, 1996 [JP] Japan .................................. 8-197297
Feb. 6, 1997 [JP] Japan .................................. 9-023480

[51] Int. Cl.$^6$ ........................................................ G11B 7/00
[52] U.S. Cl. ................................ 369/275.3; 369/44.13
[58] Field of Search ................................ 369/275.2, 275.3, 369/275.4, 44.13, 47

[56] References Cited

U.S. PATENT DOCUMENTS

| | | | |
|---|---|---|---|
| 5,023,856 | 6/1991 | Raaymakers et al. | 369/44.13 |
| 5,210,660 | 5/1993 | Hetzler . | |
| 5,444,687 | 8/1995 | Okumura . | |
| 5,463,604 | 10/1995 | Naito . | |
| 5,463,614 | 10/1995 | Morita . | |
| 5,508,985 | 4/1996 | Fairchild et al. . | |
| 5,508,995 | 4/1996 | Moriya et al. . | |
| 5,537,373 | 7/1996 | Horikiri . | |
| 5,724,338 | 3/1998 | Birukawa et al. | 369/275.4 |
| 5,742,578 | 4/1998 | Kumai et al. | 369/44.13 |
| 5,742,582 | 4/1998 | Suzuki | 369/275.3 |
| 5,754,506 | 5/1998 | Nagasawa et al. | 369/275.4 |
| 5,754,522 | 5/1998 | Kobayashi et al. | 369/275.3 |
| 5,796,711 | 8/1998 | Tomita et al. | 369/275.3 |
| 5,809,006 | 9/1998 | Davis et al. | 369/275.3 |

FOREIGN PATENT DOCUMENTS

| | | |
|---|---|---|
| 0 813 198 A2 | 12/1997 | European Pat. Off. . |
| 6-243468 | 9/1994 | Japan . |
| 7-210873 | 8/1995 | Japan . |

*Primary Examiner*—Nabil Hindi
*Attorney, Agent, or Firm*—Antonelli, Terry, Stout & Kraus, LLP

[57] ABSTRACT

A disk-like information recording medium includes recording areas provided in both of a groove portion and a land portion. The information recording medium is divided into groups of a plurality of areas, each track is divided into circular arc-shaped sectors having the same central angle arranged to be radial in the radius direction, identification information is provided at every sector, each track is divided into groups in such a manner that lengths of the circular arc-shaped sectors become almost constant among the groups, and the groove portion and the land portion are wobbled in the radius direction of the information recording medium. When the groove portion information track and the land portion information track which are the recording portions are wobbled in the radius direction, position information can be reliably obtained from the recording portions, and hence recorded information can be accessed reliably. Also, an accuracy with which the rotation of the information recording medium is controlled can be raised, and it becomes possible to position recorded information accurately.

15 Claims, 6 Drawing Sheets

LIMITER

BANDPASS FILTER

COMPARATOR

INFORMATION RECORDING MEDIUM AND METHOD AND APPARATUS FOR RECORDING AND REPRODUCING INFORMATION USING THE SAME

CROSS-REFERENCE TO RELATED APPLICATION

The application relates to a U.S. patent application Ser. No. 08/863,126, filed on May 27, 1997, entitled "INFORMATION RECORDING METHOD AND APPARATUS" by H. Miyamoto et al., and assigned to the present assignee, based on Japanese Patent Application Nos. 08-136189 filed on May 30, 1996 and 09-079587 filed on Mar. 31, 1997, disclosure of which is incorporated herein by reference.

BACKGROUND OF THE INVENTION

The present invention relates to information recording media, and particularly to a high-density information recording medium and a high-density optical recording medium of which the track width is smaller than a beam spot or a detecting means such as a magnetic head.

Japanese laid-open patent publication No. 6-176404, for example, describes an example of a high-density (narrow track) recording medium. This example uses as a recording medium an optical recording medium in which groove portions and land portions are formed on a substrate and information recording areas are formed on both of the groove portions and the land portions. Prepits are formed on a virtual prolonged line of a boundary portion between the groove portion and the land portion as identification information of a recording unit (sector), whereby recording information is recorded on both of the groove portions and the land portions and identification (address) information indicative of a recording area is handled by the prepits. Also, one prepit commonly uses address information for a pair of groove portion and land portion. According to this system, when the recording medium of this system is applied to a phase change type recording medium and a magneto-optical recording medium, information from the adjacent land portion or groove portion can be prevented from being mixed into the groove portion and the land portion owing to an interference effect caused within the beam spot (i.e. crosstalk can be cancelled out), and hence the tracks of the recording medium can be narrowed, thereby making a high-density recording become possible.

However, in the example according to the related art, inasmuch as information indicative of the position on the information recording medium is concentrated in the prepit portions and the prepit portions located in a discrete fashion, position information cannot be obtained from portions other than the prepit portions. As a consequence, it is difficult to control a rotational speed of a disk precisely with a high reliability. There is then presented the problem from a reliability standpoint that the recording medium according to the relate art is not persistent to, in particular, defects or the like.

SUMMARY OF THE INVENTION

A first object of the present invention is to provide an information recording medium in which the aforementioned problems can be solved and which can be made high in recording density and highly reliable by assigning position information to other portions than prepit portions.

A second object of the present invention is to provide an information recording and/or reproducing method in which the aforementioned problems can be solved and in which information can be recorded and/or reproduced with a high recording density and with a high reliability by using an information recording medium in which position information is assigned to other portions than prepits.

In order to attain the above-mentioned first object, the present invention used the means which follow:

(1) In an information recording medium having almost spiral-like or concentric tracks comprising both of groove portions and a land portion between the groove portions, the recording medium is divided into groups of a plurality of areas in the radius direction, each track is divided at circular arc recording units having the same central angle arranged to be radial in the radius direction within each group, identification information indicative of the recording unit is provided in the track at every recording unit, the each track is divided into groups such that a length of a circular arc-shaped recording unit becomes almost constant between the groups, and the groove portion and the land portion are wobbled in the radius direction of the information recording medium.

Thus, position information can be reliably obtained in the recording portions because the identification information is provided at every recording unit, and the groove portions and the land portions, which are the recording portions, are wobbled. In other words, recorded information can be accessed reliably and recording information can be positioned with a high accuracy. Further, since the recording units are arranged to be positioned in the radius direction of the information recording medium, the tracks can be accessed with ease, and a crosstalk caused between position information of each recording unit can be suppressed to the minimum. Since the tracks are disposed in such a manner that the lengths of the circular arc-shaped portions which are the recording units become almost the same, the recording density becomes approximately uniform. Thus, it becomes possible to efficiently use the whole surface of the disk. Furthermore, it is possible to correct the displacement of tracking with a high accuracy.

Japanese laid-open patent publication No. 6-243468 describes a technology in which grooves are wobbled and a linear velocity of a disk is calculated by a wobble cycle detecting circuit, thereby rotating the disk at a constant linear velocity (CLV).

(2) Wobble cycles and phases of the groove portion and the land portion are uniformly arranged to be radial with respect to the adjacent tracks within each group, whereby the wobbling between the adjacent tracks can be reliably reproduced without interference. Also, since the widths of the respective tracks become constant, the recording characteristics can be prevented from being affected.

(3) A constant integral multiple of the cycle at which the groove portion and the land portion are wobbled is made coincident with the length of the circular arc-shaped recording unit. Thus, the starting point and the ending point of the recording unit can be detected reliably, and it becomes possible to detect an accurate position in the recording unit. Moreover, since the length of the recording unit and the wobble cycle in which the groove portion and the land portion are wobbled are synchronized with each other, it is possible to automatically and constantly keep the relative speed of the recording medium constant by making the frequency of the wobbling become constant.

(4) The maximum values of the amplitudes of wobbling in which the groove portion and the land portion are wobbled were selected to be smaller than one-tenth of the track width. Thus, the influence that is exerted upon the recording and reproducing characteristics by the above-mentioned wobbling could be suppressed to be less than 1−cos (180/10)=−26 dB, and the influence which affects an S/N (signal-to-noise ratio)(~20 dB) necessary for the normal recording and/or reproduction can be suppressed to be negligibly small.

(5) Identification information was formed by prepits which were very small concave portions and convex portions disposed in the spacing between the groove portion and the land portion. Thus, it becomes easy to mass-produce an information recording medium with identification information previously provided therein by a simple manufacturing process such as an injection molding. Therefore, a productivity with which an information recording medium is mass-produced can be raised.

(6) Identification information was disposed in an intermediate portion formed between a track and a track adjoining to the former track. Thus, since one identification information can be used by both of the two tracks, identification information assigned to one information area is doubled, and hence a reliability of the identification information can be improved. The information tracks in which identification information is disposed can be discriminated from each other by effectively utilizing a difference between the positions of the directions along the track. Moreover, since a relationship between the identification information of the adjacent track and the identification information of the track falls within a constant range, it becomes possible to discriminate the track from the identification information of the adjacent track.

(7) The track of the groove portion and the track of the land portion were disposed at least at one portion of the one circumference of the information recording medium in such a way as to be connected from the groove portion to the land portion or from the land portion to the groove portion. Thus, since it becomes possible to continuously access the tracks from the recording track of the groove portion to the recording track of the land portion, an effective transfer rate of information can be raised. Therefore, it becomes easy to record and/or reproduce successive information such as moving picture information on and/or from the information recording medium.

The present invention used the following means in order to attain the above-mentioned second object:

(8) The above-mentioned information recording medium was used, and light was irradiated on the track. Then, a wobbling signal was detected by detecting reflected light with at least two split photo detectors, and information was recorded in the information recording medium and/or reproduced from the information recording medium by controlling a rotational speed of the information recording medium in such a manner that the cycle of the detected wobbling signal becomes constant. Thus, a rotational speed of the disk-like information recording medium can be controlled with ease and with a high accuracy in such a manner that a scanning velocity of light on the information recording medium becomes almost constant.

(9) The above-mentioned information recording medium was used, and light was irradiated on the track. Then, a wobbling signal was detected by detecting reflected light with at least two split photo detectors, and information was recorded on the information recording medium by using a clock which was generated in synchronism with the phase of the detected wobbling signal. Thus, since it becomes easy to make the length of each recording unit on the information recording medium become constant, the lengths of extra gaps on the information recording medium can be minimized.

(10) The above-mentioned information recording medium was used, and light was irradiated on the track. Then, a wobbling signal was detected by detecting reflected light with at least two split photo detectors, and a displacement of the track was detected by comparing the amplitudes of the wobbling signals obtained from the two photo detectors of the split photo detector. Thus, since information can be recorded on the information recording medium and/or reproduced from the information recording medium while the displacement amount of the track is being monitored constantly, a reliability in the positioning servo can be improved greatly.

(11) The recording medium is an optical disk of a concentric-shaped or spiral-like groove configuration arranged along the tracks. This groove structure is wobbled in the radius direction of the optical disk. The track of the optical disk is divided into a plurality of recording units by radial boundary lines in the track direction. Of the recording units thus divided by the radial boundary lines, at least two recording units adjoining in the radius direction of the optical disk constitute one zone, and the groove structures included in the respective recording units within one zone have almost the same number of the wobbling.

Thus, since the position information can be highly reliably obtained even from the recording portions owing to the wobbling, recorded information can be accessed reliably. Hence, it becomes possible to accurately position recorded information on the optical disk. Further, since the recording units are arranged to be radial in the radius direction within the group (zone), recorded information among the tracks can be accessed with ease, and a crosstalk between the position information of the respective recording units can be suppressed to the minimum.

The recording unit need not always agree with the length of the sector, and a plurality of sectors of more than two sectors may be collected as the recording unit. Furthermore, a plurality of recording units may be collected as a logical sector or a logical block used to correct an error. At any rate, the recording unit herein will be referred to as an area of almost constant length provided within the optical disk.

(12) The recording medium is an optical disk of a concentric-shaped or spiral-like groove configuration arranged along the tracks. This groove structure is wobbled in the radius direction of the optical disk. The track of the optical disk is divided into a plurality of recording units by radial boundary lines in the track direction. Of the recording units thus divided by the radial boundary lines, at least two recording units which are adjoining to each other in the radius direction of the optical disk constitute one zone. The optical disk includes a plurality of zones, and the groove structures included in one recording units within any zone have almost the same number of the wobbling.

Thus, since the relationship between the information recording unit and the duration of the wobbling becomes equal on the whole surface of the optical disk, it becomes possible to control the rotational speed of the optical disk and to generate the recording clock by using the wobble signal without switching the wobble signal in the zone. Therefore, a density within the optical disk can be made almost uniform by the apparatus of the simple configuration, and hence it becomes easy to utilize the whole surface of the optical disk efficiently.

(13) The recording medium is an optical disk having a concentric-shaped or a spiral-like groove configuration, and the groove structure is wobbled in the radius direction of the optical disk. The groove structure of the optical disk is divided into a plurality of recording units in the circumference direction of the optical disk by the radial boundary lines. Of the recording units thus divided by the radial boundary lines, at least two recording units which are adjoining to each other in the radius direction constitute one zone, and the groove structures which are adjoining to each other in the radius direction of the optical disk have substantially the same wobbling cycle.

Alternatively, there might be used the following means:

(14) The recording medium is an optical disk having a concentric-shaped or a spiral-like groove structure, and the groove structure is wobbled in the radius direction of the optical disk. The groove structure of the optical disk is divided into a plurality of recording units in the circumference direction of the optical disk by the radial boundary lines. Of the recording units thus divided by the radial boundary lines, at least two recording units which are adjoining to each other in the radius direction of the optical disk constitute one zone. The groove structures of the adjacent recording unit areas in the radius direction of the optical disk within one zone have almost the same wobbling cycle and the same number of the wobbling.

Thus, since the position information can be reliably obtained even from the recording portion, recorded information on the optical disk can be accessed highly reliably, and the recorded information can be positioned with a high accuracy. Furthermore, since the wobbling is arranged to be radial in the radius direction within the group (zone) and the phases of the wobbling are the same in the grooves, it becomes easy to access the tracks of the optical disk. Also, it becomes easy to detect the wobbling signal at a high quality of a signal. Strictly speaking from a theory standpoint, although this wobbling signal has a cycle proportional to the position at which the groove is located in the radius direction within one zone, the grooves which are close to each other like the grooves within one zone have almost the same wobbling cycle. Incidentally, the number of the wobbling need not always be limited to an integral number within the recording unit area.

(15) The recording medium is an optical disk having a concentric-shaped or a spiral-like groove structure. The groove structure is wobbled in the radius direction of the optical disk, and the groove structure of the optical disk is divided into a plurality of recording units in the circumference direction of the optical disk by the radial boundary lines. Of the recording units thus divided by the radial boundary lines, at least two recording units which are adjoining to each other in the radius direction constitute one zone. The optical disk includes a plurality of zones, and the groove structure has almost the same wobbling cycle in the unit areas which are adjoining to each other in the radius direction of the optical disk within every zone, and also has the same number of the wobbling.

Thus, since the relationship between the information recording unit and the duration of the wobbling cycle becomes equal on the whole surface of the optical disk, it becomes possible to control the rotational speed of the optical disk and to generate a recording clock by using the wobbling signal without switching the wobbling signal in the zone. Thus, since a density within the optical disk can be made almost uniform by the apparatus of the simple configuration, it becomes easy to utilize the whole surface of the optical disk efficiently.

(16) The recording medium is an optical disk having a concentric-shaped or a spiral-like groove structure. The groove structure is wobbled in the radius direction of the optical disk, and the track of the optical disk is divided into a plurality of recording units in the track direction by the radial boundary lines. Of the recording units thus divided by the radial boundary lines, at least two recording units which are adjoining to each other in the radius direction of the optical disk constitute one zone. Central angles corresponding to one period of the wobbling of the groove structure included in the respective recording units within one zone are the same, and the starting positions of the wobbling are arranged to be radial in the radius direction of the optical disk at each recording unit.

Thus, since the wobbling signal between the adjacent tracks can be reliably reproduced without interference and the width of each track becomes constant, the recording characteristics can be protected from being affected.

(17) The recording medium is an optical disk having a concentric-shaped or a spiral-like groove structure. The groove structure is wobbled in the radius direction of the optical disk. The track of the optical disk is divided into a plurality of recording units in the circumference direction of the optical disk by the radial boundary lines. Of the recording units thus divided by the radial boundary lines, at least two recording units which are adjoining to each other in the radius direction constitute one zone. Assuming that N is one integral number that is made common to all of the recording units on the optical disk, then the optical disk includes a plurality of zones, and all wobble cycles included in one recording unit of each zone is set to approximately 1/N times the length of the recording unit.

Thus, since the relationship between the information recording unit and the duration of the wobbling cycle becomes equal on the whole surface of the optical disk, it becomes possible to control the rotational speed of the optical disk and to generate the recording clock by using the wobble signal without switching the wobble signal depending on the zone, and hence a density within the optical disk can be made almost uniform by the apparatus of the simple configuration. As a consequence, it becomes easy to make effective use of the whole surface of the optical disk efficiently. Moreover, since the integral multiple of the wobbling cycle agrees with the length of the recording unit, the phases of the wobbling signal can be perfectly connected between the adjacent recording units without fractions. Hence, it becomes easy to generate a timing signal such as a clock over a consecutive recording unit by using the wobbling signal. The fact that the wobbling signal is connected without fractions as described above means that the phases of the wobbling signals are continuous between the adjacent recording units, and the wobbling signals need not always be continuously connected physically. Specifically, although it is possible to use such a wobble structure that the wobbling signal is dropped out over several cycles at the boundary portion of the recording units, if such dropout portion is interpolated (compensated for), then the phase of the wobble signal is continuously connected in the adjacent recording unit areas.

(18) Identification information was provided at every recording unit. Thus, it becomes easy to access the recording unit on the optical disk. Also, it becomes possible to fix the position of the beam spot at all positions on the optical disk by combining a signal detected from the wobbling and the identification information. Therefore, a reliability with which information is recorded on the optical disk and/or reproduced from the optical disk can be improved. Moreover, an accuracy with which recorded information is positioned on the recording medium can be improved. Thus, a buffer area required when information is recorded on the recording medium can be reduced. As a consequence, it becomes possible to enlarge a recording capacity of the recording medium. Moreover, even when a part of identification information on the optical disk cannot be detected due to a defect or the like, the position of the beam spot can be identified based on beam spot position information obtained from the wobbling so that a reliability with which information is recorded on the optical disk and/or reproduced from the optical disk can be improved greatly. If the above-mentioned advantage is used, even though recording media are not inspected when they are shipped, a reliability with which information is recorded on the optical disk and/or reproduced from the optical disk can be maintained so that a cost of the recording medium can be reduced considerably. Moreover, since the recording medium is very resistant to smudges, and need not be protected by some suitable means such as a case. Thus, it becomes possible to provide an inexpensive recording medium.

(19) The above-mentioned identification information was formed by prepits comprising optical concave or convex portions.

Thus, optical disks can be mass-produced with ease by a replica method, and it becomes possible to provide stable and highly-reliable identification information which can be prevented from being deteriorated.

(20) The recording medium includes information recording areas provided along the central line of the groove structure and the central line of the land structure.

Thus, according to the above-mentioned information recording areas, it becomes possible to dispose recorded information with a high density, i.e. it is possible to realize a medium of a high density (large capacity).

(21) Light is irradiated on the recording medium, a wobble signal is detected by detecting reflected light of the irradiated light by a photo detector, and a recording or reproducing timing signal is obtained by using the wobble signal.

Thus, since position information is reliably obtained even from the recording portions by the wobbling of the groove portions and the land portions which are served as the recording portions, recorded information can be accessed highly reliably, and recorded information can be positioned on the recording medium with a high accuracy, i.e. information can be recorded and/or reproduced on and/or from the recording medium highly reliably, and an accuracy with which information is recorded on the recording medium can be raised.

(22) Light is irradiated on the recording medium, and the wobble signal is detected by detecting reflected light of the irradiated light with a photo detector. By using the wobble signal, it is possible to obtain a starting or ending timing at which at least any of recorded information and identification information is recorded on and/or reproduced from the recording medium.

Thus, since timing information can be obtained highly reliably even when a timing at which the recording unit and the identification signal are generated is fluctuated because a revolution rate of the optical disk, for example, is not stable due to the wobbling of the groove portions and the land portions which are served as the recording portions, the recorded information on the optical disk can be accessed highly reliably. As a consequence, a speed at which recorded information is accessed can be raised, and it becomes possible to use an inexpensive motor so that an information recording and/or reproducing apparatus can be produced inexpensively.

(23) At least one identification information is detected by irradiating the recording medium with light. When at least one succeeding identification information which succeeds the identification information is detected, the recording area that should be identified by the succeeding identification information is recorded on or reproduced from the recording medium by using either an identification information detecting signal indicating that the succeeding identification information is detected or a pseudo-succeeding identification information detecting signal which is generated from a recording or reproducing timing signal obtained from the above-mentioned wobbling of the groove portions and the land portions.

Thus, even when the succeeding identification information cannot be detected due to some causes such as defects or smudges, the recording area that should be identified by the succeeding identification information can be accessed by using the signal obtained from the wobbling so that a reliability with which information is recorded on the recording medium and/or reproduced from the recording medium can be increased greatly.

(24) There is provided a method of recording and/or reproducing information in which information is recorded on and/or reproduced from a recording medium by using a timing signal obtained from the wobbling instead of identification information if the identification information cannot be detected when the identification information is detected by irradiating light on the recording medium.

Thus, even when the succeeding identification information cannot be detected due to some causes such as defects or smudges, the recording area can be accessed highly reliably by using the wobble signal, and hence a reliability with which information is recorded on and/or reproduced from the recording medium can be improved greatly. Therefore, since the reliability in recording and/or reproducing information on and/or from the recording medium can be maintained high without inspecting the recording medium when the recording medium is shipped, it becomes possible to reduce the cost of the recording medium considerably. Furthermore, since the recording medium becomes very resistant to the smudges, the recording medium need not be protected by some suitable means such as a case. Therefore, it becomes possible to provide a more inexpensive recording medium.

(25) Light is irradiated on the recording medium, and a wobble signal is detected by detecting reflected light of the irradiated light with a photo detector. When a recording or reproducing timing signal is generated from the wobble signal, at least the portion in which the above-mentioned identification information is provided can be interpolated by a signal synchronized with a series of immediately-preceding wobble signals.

Thus, the recording and/or reproducing timing signal obtained from the wobble signal is prevented from being deteriorated due to the identification signal of the identification information portion, and hence the position information from the wobble information can be highly reliably obtained even at the position located immediately after the identification information. Specifically, since the area located immediately after the identification information that cannot be detected can be accessed highly reliably, it is possible to maintain a reliability with which information can be recorded on and/or reproduced from the recording medium. Therefore, it becomes possible to carry out a real time recording and/or reproduction and a highly-reliable recording without the dropout of the information at all.

DESCRIPTION OF THE PREFERRED EMBODIMENTS

Figure 1:
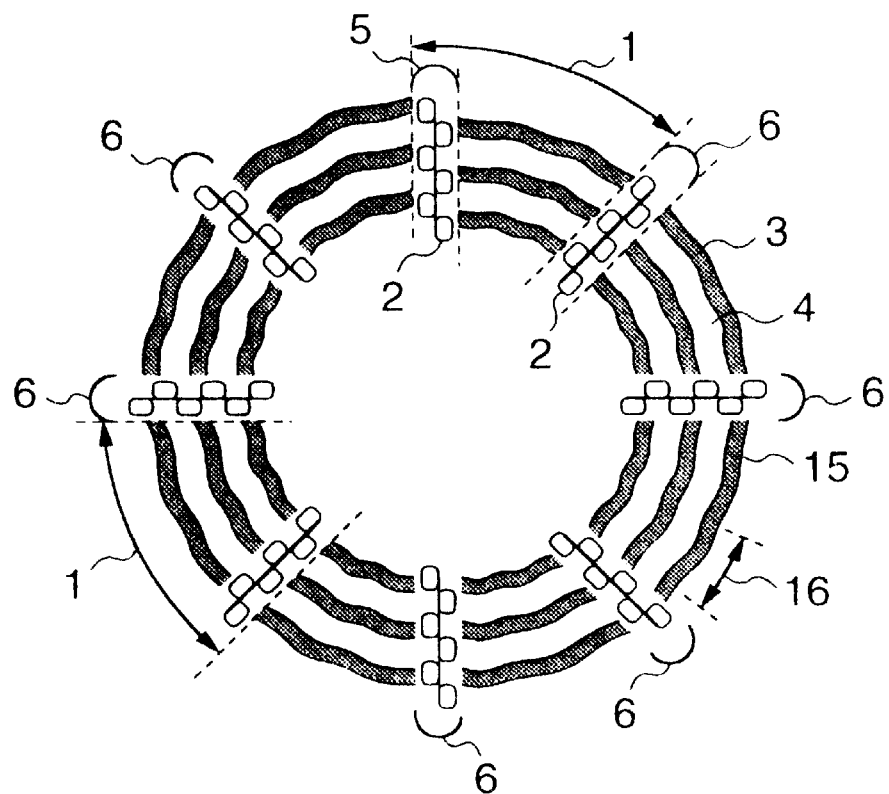
FIG. 1 is a plan view illustrating the manner in which the tracks are disposed in an information recording medium according to an embodiment of the present invention.

Embodiments of the present invention will hereinafter be described with reference to the accompanying drawings. Reference numerals in the sheets of drawings should identify the following elements and parts.

Reference numeral 1 denotes a recording unit, reference numeral 2 denotes identification information, reference numeral 3 denotes a groove portion, reference numeral 4 denotes a land portion, reference numeral 5 denotes a track switching portion, reference numeral 6 denotes a non-switching portion, reference numeral 7 denotes a beam spot, reference numeral 15 denotes a wobbling, reference numeral 16 denotes a one cycle of wobbling, reference numeral 21 denotes identification information disposed at a first position, reference numeral 22 denotes identification information disposed at a second position, reference numeral 23 denotes a prepit, reference numerals 11 and 12 denote recording units, reference numerals 91, 92, 93 denote grooves, and reference numerals 81, 82 denote information recording portions, respectively.

EMBODIMENT 1: INFORMATION RECORDING MEDIUM

Figure 5:
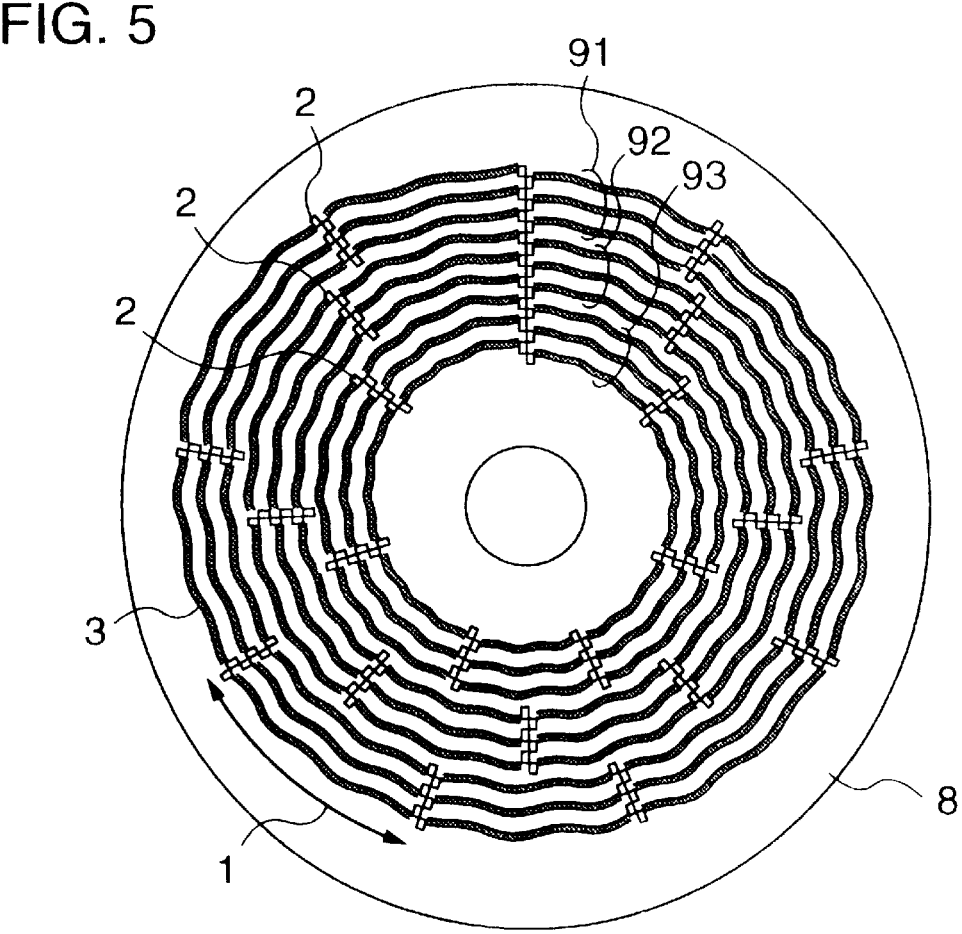
FIG. 5 is a plan view illustrating the manner in which the divided groups are disposed in the information recording medium according to the embodiment of the present invention.

FIG. 5 shows the manner in which tracks and sectors of the information recording medium according to the present invention are disposed. As shown in FIG. 5, a plurality of groups 91, 92 and 93 are disposed in the radius direction of a disk-like recording medium 8. The track 3 is wobbled by a very small amount in the radius direction of the disk-like recording medium 8. Each track 3 is divided into a plurality of circular arc-like sectors (recording units) 1 arrayed in the radius direction of the disk-like recording medium 8. The length of the circular arc-like sector 1 is selected in such a manner that the number of the divided sectors per circumference of the disk-like recording medium 8 increases in the groups located at the position of the larger radius so as to make the length of the circular arc-like sector 1 become almost constant independently of the groups.

FIG. 1 shows an example of the manner in which tracks are disposed within one group of the information recording medium according to the present invention. As shown in FIG. 1, within one group, there are alternately located groove portion information tracks 3 having a width of 0.7 μm and a depth of 60 nm and a land portion information track 4 having a width of 0.7 μm. The groove portion information track 3 and the land portion information track 4 are connected to each other by a switching portion 5. Specifically, the groove portion information track 3 is arranged such that it is connected to the adjacent land portion information track 4 after one circumference of the track, and the land portion information track 4 is arranged such that it is connected to the adjacent groove portion information track 3 after one circumference of the track. Each track is divided into a plurality of circular arc-like recording units such as sectors, and identification information 2 is disposed at the head of each of the information recording units 1. In this example, the length of the sector is about 8 mm, which corresponds to a user capacity of 2048 bytes. The groove portion information track 3 and the land portion information track 4 are wobbled with an amplitude of about 20 nm in the radius direction of the disk-like recording medium 8. A wobble cycle during which the groove portion information 3 and the land portion information track 4 are wobbled in the radius direction was set to 1/145 of the sector length, i.e. about 55 μm. The ratio of 1:145 was selected in such a manner that the wobbling cycle becomes an integral multiple of the length (channel bit length) of recorded data. According to this arrangement, it becomes easy to generate a recording clock from the wobbling.

Figure 2:
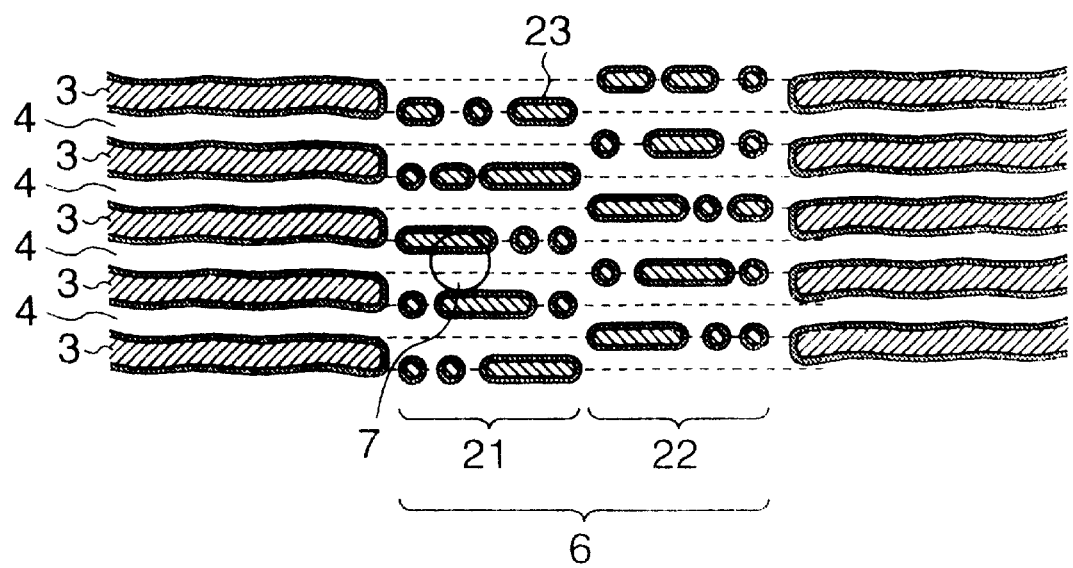
FIG. 2 is a plan view illustrating the manner in which identification information is disposed in the information recording medium according to the embodiment of the present invention.
Figure 3:
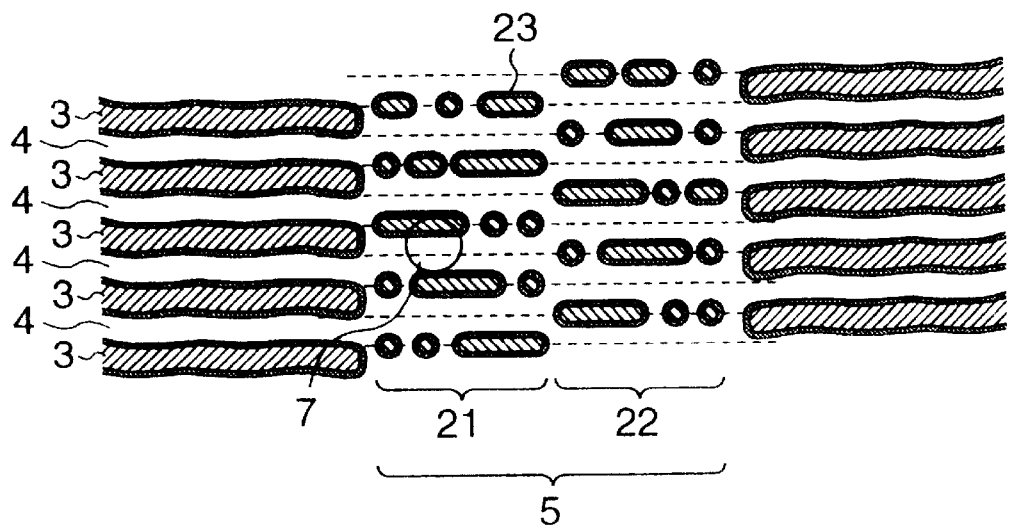
FIG. 3 is a plan view illustrating the manner in which identification information is disposed at a track connected portion in the information recording medium according to the embodiment of the present invention.

FIGS. 2 and 3 are respectively fragmentary plan views illustrating information identification information portions in an enlarged scale.

FIG. 2 schematically shows a portion 6 in which preceding and succeeding tracks of identification information are connected by the groove portion information tracks 3 and the land portion information tracks 4. Also, FIG. 3 schematically shows a portion in which preceding and succeeding tracks are connected at the groove portion information tracks 3 and the land portion information tracks 4, i.e. a portion in which identification information is disposed such that the positions of the directions extended along the information tracks are different in the adjacent tracks but agree with the track advanced or delayed by two tracks. As shown in FIG. 2, identification information is disposed to be radial in the radius direction at the two places of the first position 21 and the second position 22. The preceding and succeeding tracks are connected by the groove portion information tracks 3 and the land portion information tracks 4. In this illustrated example of FIG. 2, each identification information corresponds to the recording area of the right-hand side information track. Further, identification information corresponding to the right-hand side groove portion information track 3 is disposed at the first position 21, and identification information corresponding to the land portion information track 4 is disposed at the second position 22. Specifically, the positions of the identification information along the information tracks are different from each other in the adjacent tracks but agree with each other in the tracks advanced or delayed by the two tracks.

In the switching portion 5 of FIG. 3, the preceding and succeeding tracks of identification information are connected to each other in the groove portion information track 3 and the land portion information track 4. Also in this case, each identification information corresponds to the recording area of the right-hand side information track. As shown in FIG. 3, Identification information corresponding to the right-hand side groove portion information track 3 is disposed at the first position 21, and identification information corresponding to the land portion information track 4 is disposed at the second position 22.

As a consequence, when the beam spot 7 scans the land portion information track 4, only pits of the one side are constantly reproduced. There is then no risk that a crosstalk occurs from the adjacent track. Therefore, it becomes possible to satisfactorily reproduce address information from the prepits without crosstalk. The address information at the prepit is recorded by an 8/16 (eight-to-sixteen) modulation code (channel bit length is 0.2 $\mu$m).

Figure 4:
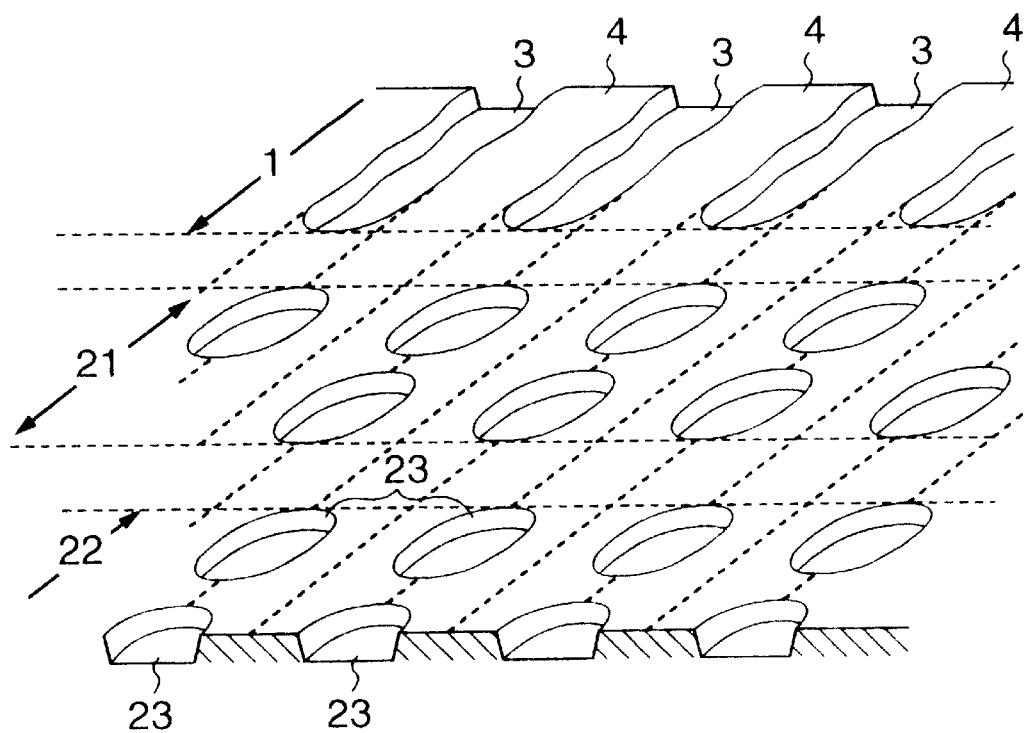
FIG. 4 is a fragmentary perspective view illustrating the information recording medium according to the present invention in an enlarged scale.

FIG. 4 is a perspective view illustrating the manner in which tracks and identification information are configured according to the embodiment of the present invention, highlighting the manner in which identification information is formed by small concave portions (pits) 23.

According to this embodiment, since the pits 23 are equally disposed on both sides of the track (land portion or the groove portion), a bad influence exerted by the pits 23 upon a tracking servo signal can be cancelled out. Accordingly, it is possible to suppress a track offset to be sufficiently small. Further, when the land portion information track 4, for example, is reproduced, address information of the first prepit portion 21 and address information of the second prepit portion 22 are reproduced continuously. Therefore, if information is disposed in such a fashion that both of the address information of the first prepit portion 21 and the address information of the second prepit portion 22 may be integrated as one address information, then address (track No.), i.e. identification information can be set independently of the land portion information track 4 and the groove portion information track 3. Specifically, it becomes possible to discriminate the land portion information track 4 and the groove portion information track 3 from each other by continuously reproducing the address information of the first prepit portion 21 and the address information of the second prepit portion 22.

Figure 6:
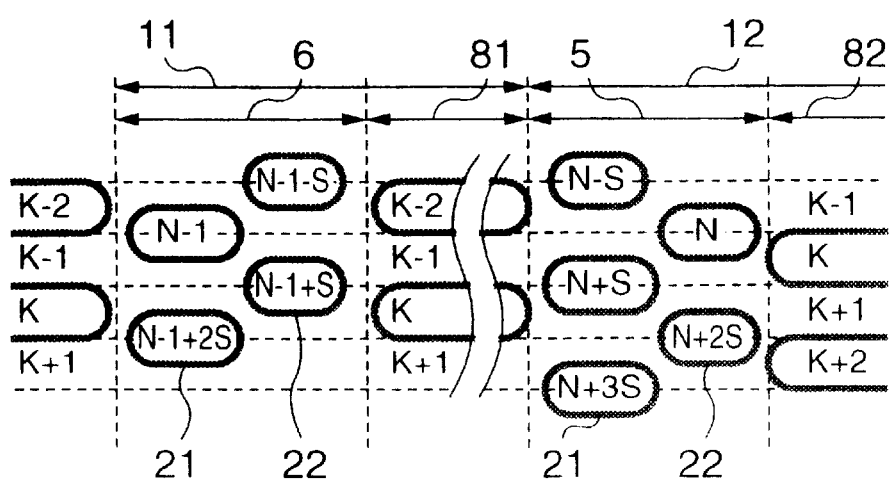
FIG. 6 is a plan view illustrating the manner in which identification information is numbered in the information recording medium according to the embodiment of the present invention.

FIG. 6 shows concretely an example of the manner in which identification information is numbered. In FIG. 6, there are illustrated the identification information of the recording area 11 and the identification information of the recording area 12. In this example, identification information is recorded on and/or reproduced from the recording medium by relatively scanning detection spots from left to right of FIG. 6. A groove portion information track K of the left-hand side, for example, is connected to a land portion information track K+1 of the right-hand side of the switching portion 5. A land portion information track K+1 of the left-hand side is connected to the land portion information track K+1 after one circumference. In this example, identification information of an information recording area 81 of the groove portion information track K, for example, is N−1+S where S denotes a sum of optical recording information units per circumference of the track. When the identification information portion 6 of this track is reproduced by the beam spot or the like, N−1+2S is reproduced as identification information located at the first position 21, and N−1+S is reproduced as identification information located as the second position 22. In this case, if a smaller number is constantly used as a recording area No. in advance, then N−1+S is used as identification information of the information recording area 81 of this groove portion information track K. When the land portion information track K−1 is scanned by the beam spot or the like, N−1 is similarly used as identification information located at the first position 21. At the same time, it is possible to discriminate the groove portion information track and the land portion information track from each other by detecting whether the identification information located at the first position 21 or the identification information located at the second position 22 is used.

When the information track located at the track switching portion 5 is reproduced, a correspondence of identification information and recorded information can be judged in exactly the same manner, and also the groove portion information track and the land portion information track can be discriminated from each other in exactly the same way. Accordingly, it is possible to switch the track polarity between the groove portion information track and the land portion information track by making effective use of the above-mentioned relationship.

While there are two sets of the first and second identification information portions as described above, the present invention is not limited thereto, and there may be provided a plurality of sets of identification information portions. If there are provided four sets of identification information portions, for example, then first and third prepit portions are located under the groove portions and second and fourth prepit portions are located above the groove portions. If the number of the prepit portions increases, then the information recording medium according to the present invention becomes resistant to defects or the like, and therefore becomes highly-reliable.

Here, a phase change type recording film (GeSbTe) was used as a recording film of this information recording medium. Accordingly, a recording mark is produced in the form of amorphous area.

EMBODIMENT 2: INFORMATION RECORDING AND/OR REPRODUCING METHOD

An example of an information recording and/or reproducing method using the recording medium according to the embodiment 1 will be described with reference to FIG. 7.

Figure 7:
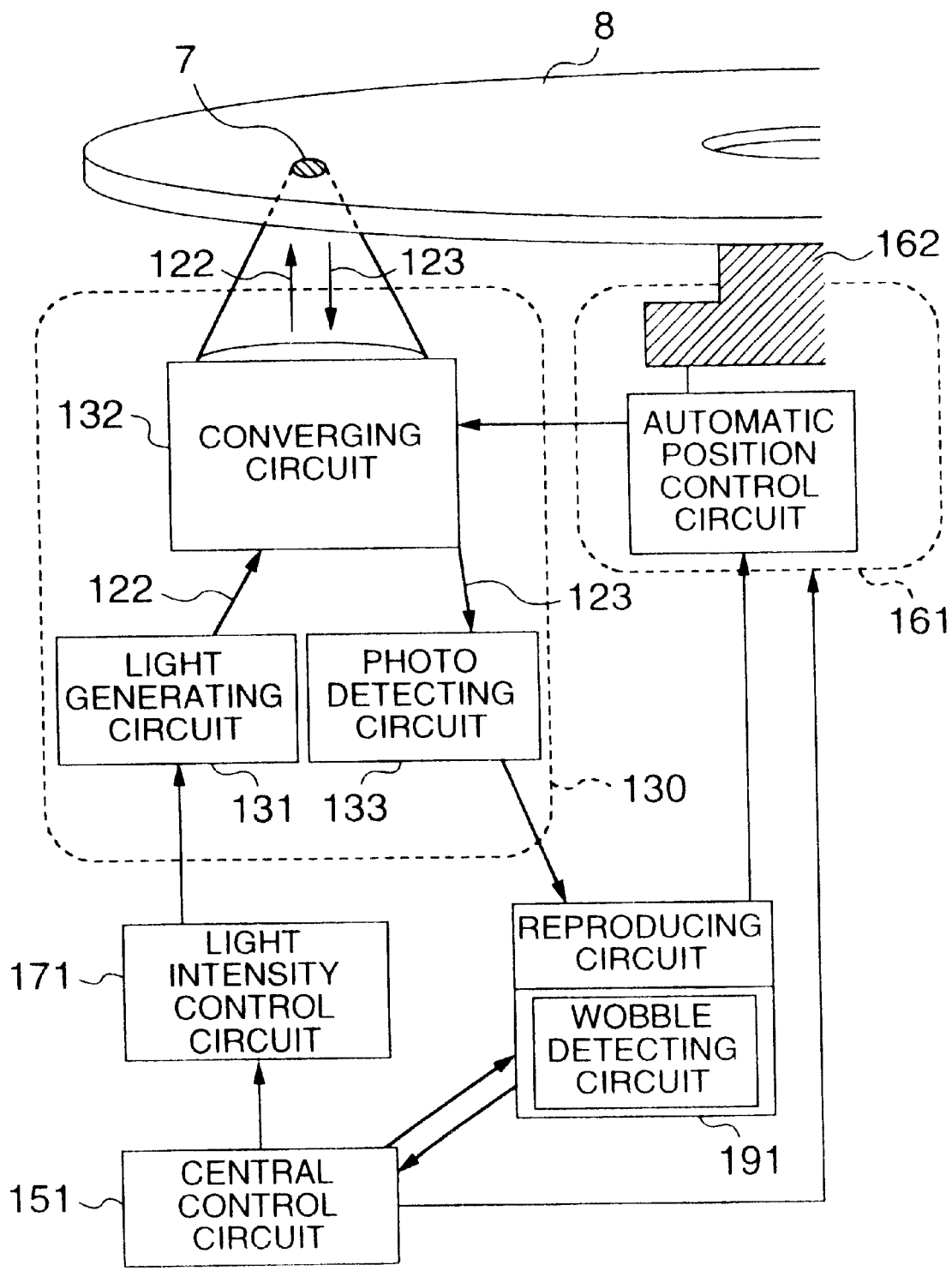
FIG. 7 is a block diagram showing an example of a recording and/or reproducing apparatus using the information recording medium according to the present invention.

As shown in FIG. 7, the information recording medium 8 according to the embodiment 1 is rotated by a motor 162. A light intensity control circuit 171 controls a light generating circuit 131 so that the light generating circuit 131 generates light 122 having a light intensity instructed by a central control circuit 151. A converging circuit 132 converges the light 122 generated from the light generating circuit 131 to form a beam spot 7 on the information recording medium 8. Reflected light 123 of the light 122 is detected by a photo detecting circuit 133. The photo detecting circuit 133 comprises a plurality of split photo detectors. A wobble detecting circuit 191 reproduces information from the information recording medium 8 by using a reproduced signal 130 from the split photo detectors of the photo detecting circuit 133.

When a wobbling of the track on the information recording medium 8 is detected, there is used a differential output among the outputs from the split photo detectors of the photo detecting circuit 133. The reason that the differential output is utilized is based on such a fact that an intensity distribution of diffracted light from the beam spot is changed depending on a positional relationship between the beam spot and the track. On the basis of the wobble signal detected by the wobble detecting circuit 191, information indicative of the positional relationship between the beam spot and the track and further prepit identification information, a position control circuit 161 controls the position of the converging circuit 132 and a rotation frequency of the motor 162. When the position control circuit 161 controls the rotation frequency of the motor 162, the rotation frequency is controlled in such a manner that a reproduced wobble signal may have a previously-determined constant value. If the rotational frequency of the motor 162 is controlled by the position control circuit 161 as described above, then the rotational speed of the motor 162 can be automatically and properly controlled independently of the groups on the information recording medium 8. Also, since this rotation information of the motor 162 has one cycle of about 55 μm, the rotation information is very high in density, and it becomes possible to control the rotation of the motor 162 with a high accuracy. Furthermore, since this rotation information is disposed all over one revolution of the disk, even when a part of the rotation information is dropped out by some causes such as smudges or defects, the rotation information can be reproduced from the information recording medium 8 with a high accuracy satisfactorily.

EMBODIMENT 3: INFORMATION RECORDING AND/OR REPRODUCING METHOD

A description will now be given on a method of recording and/or reproducing information on and/or from an information recording medium by generating a clock synchronized with a phase of a wobble signal when information is recorded and/or reproduced. In order to generate the above-mentioned clock synchronized with the phase of the wobble signal, there is used a PLL (PhaseLocked Loop) circuit. Since this clock is accurately synchronized with the wobble information of the information recording medium, if information is recorded on and/or reproduced from the information recording medium by using this clock, then information can be recorded on and/or reproduced from the information recording medium at a timing perfectly synchronized with the position on the information recording medium. Therefore, information can be recorded on and/or reproduced from the information recording medium without providing unnecessary buffer areas on the information recording medium, and it is possible to obtain an information recording medium which is high in format efficiency. As a consequence, there can be raised a recording capacity of the information recording medium. Furthermore, since the wobble information (rotation information) is disposed all over one revolution of the disk, even when a part of the wobble information is dropped out, information can be reproduced from the information recording medium with a high reliability satisfactorily.

EMBODIMENT 4: INFORMATION RECORDING MEDIUM

FIG. 5 shows the manner in which the tracks and the sectors of the recording medium according to the embodiment of the present invention are disposed. As shown in FIG. 5, there are disposed a plurality of zones (groups) 91, 92, and 93 in the radius direction of the disk-like recording medium 8 having a diameter of 120 mm. In this example of FIG. 5, there are divided 24 zones of which the radiuses are ranging from about 24 mm to 58 mm. Accordingly, one zone has a band width of about 1.4 mm. The groove portion information track 3 is wobbled by a very small amount in the radius direction of the disk-like recording medium 8. Each of the groove portion information track 3 is divided into a plurality of circular arc-like sectors (recording units) 1 arrayed in the radius direction of the disk-like recording medium 8. The length of the circular arc-like sector 1 is made almost constant independently of the zones (groups) so that the number of the divided sectors per circumference increases in the zone located at the position of the larger radius. In this embodiment, each track 3 is divided in such a manner that there are provided 17 recording units 1 per circumference in the zone (inner-most peripheral zone) of the radius of about 25 mm. The number of the divided zones increases one by one in the outer peripheral zone. By using the information recording medium having the groups divided in such a manner that the number of the divided groups increases in the outer peripheral zone as described above, the lengths of the recording units 1 in the inner and outer peripheries of the information recording medium 8 can be made almost constant. In other words, the density of the rotation information can be made substantially constant, and the surface area (i.e. whole surface) of the information recording medium 8 can be used effectively. Moreover, since information can be recorded on and/or reproduced from the information recording medium at the same rotational speed and with the same recording frequency within each group, an information recording and/or reproducing apparatus using the information recording medium can be simplified in configuration. It is needless to say that the lengths of the recording units are slightly different in the inside and the outside of each zone.

FIG. 1 shows an example of the manner in which tracks within one group are disposed in the information recording medium according to the present invention. As shown in FIG. 1, there are alternately disposed the groove portion information tracks 3 having a width of 0.74 μm and a depth of 60 nm and the land portion information tracks 4 having a width of 0.74 μm. In each zone, there are disposed about 950 groove portion information tracks 3 and the land portion information tracks 4 of the same number as that of the groove portion information track 3. The groove portion information track 3 and the land portion information track 4 are connected to each other by the track switching portion 5 which is located at one place on one circumference of the disk. Specifically, the groove portion information track 3 is connected to the adjacent land portion information track 4 after one circumference of the track, and the land portion information track 4 is connected to the adjacent groove portion information track 3 after one circumference of the track. Each track is divided into a plurality of circular arc-like information recording units 1, and the identification information 2 is disposed at the starting portion of each information recording unit 1. In this example, the length of the information recording unit 1 is about 8.5 mm, which corresponds to a user capacity of 2048 bytes.

The groove portion and the land portion are wobbled in the radius direction of the information recording medium by a half width amplitude of about 20 nm. The wobble cycle was set to 1/232 of the sector length or about 37 μm. The ratio of 1:232 is set not only within one group (zone) but also in all the recording units 1 on the disk. The ratio of 1:232 was selected in such a fashion that the wobble cycle becomes an integral multiple (in this example, 186 times) of the unit length (channel bit length) of the recorded data. Accordingly, the length of the recording unit is equivalent to 232×186=43152 channel bits when it is expressed by the channel bit number. Since the wobble cycle is equal to the integral multiples of the recording channel bit as described above, it is possible to easily generate a recording clock by multiplying the wobble frequency with an integral number. Moreover, since the relationship between the information recording unit 1 and the duration of the wobbling cycle becomes equal over the whole surface of the disk, it becomes possible to generate the recording clock by using the signal obtained from the wobbling without switching the signal at the zone. Thus, a density within the disk can be made almost uniform by the apparatus of the simple configuration, and the whole surface of the disk can be used efficiently. Furthermore, if the rotational speed of the disk is controlled in such a manner that the wobbling frequency becomes constant, then it becomes possible to make a relative linear velocity between the beam spot and the information recording medium almost constant independently of the position of the information recording medium. If the linear velocity is made substantially constant as described above, then information can be recorded on and/or reproduced from the recording medium under the same recording conditions independently of the position of the information recording medium. Thus, the recording and reproducing characteristics of the information recording medium can be controlled with ease, and hence the recording apparatus and the information recording medium can be configured with ease. Here, since the lengths of the recording areas 1 are slightly different in the inside and the outside of the zone, the duration of the wobble cycle of a reciprocal of an integral number of the recording unit also is different in the inner and outer peripheries of the zone. Thus, it is needless to say that a linear velocity also is different slightly. However, because central angles formed by the recording units are constant within the zone, the revolution rate (angular velocity) within the zone become constants so that it becomes possible to access the information recording medium within the zone at a high speed.

Moreover, since the integral multiple (232 times) of the wobbling cycle agrees with the length of the recording unit 1, the phases of the wobbling signals can be perfectly connected to each other without fractions between the adjacent recording units 1. Thus, it is easy to generate a timing signal such as a clock over the consecutive recording units 1 by using the wobbling signal. The fact that the phases of the wobbling signals are perfectly connected to each other without fractions means that the phases of the wobbling signals are made continuous between the adjacent recording units 1 but the wobbling signals need not always be continuous from a physical standpoint. Specifically, there might be used such an information recording medium in which a wobbling signal is dropped out at the boundary portion of the recording units 1 over several cycles. In that case, if such dropped-out portions are interpolated, then the phases of the wobbling signals may be connected between the adjacent recording units 1. In actual practice, according to this embodiment, the identification information composed of prepits is provided at the starting portion of the recording unit and neither the groove portion information track 3 nor the land portion information track 4 exists with the result that the wobble signal is not formed at all. That is, the wobble signal is dropped out during about 11.2 cycles due to this identification information 2. Accordingly, while there exist about 220.8 wobble signals in actual practice, the length of the recording information unit becomes exactly 232 times the cycle of the wobble signal.

Here, the recording unit in this embodiment need not always agree with the length of the sector. For example, more than two sectors may be integrated as one recording unit, and identification information may be disposed within such integrated recording unit. Moreover, a plurality of recording units may be integrated as a logical sector or a logical block necessary for correcting errors. At any rate, the recording unit in this embodiment is referred to as an area of substantially a constant length in which identification information is disposed at the starting portion thereof.

FIGS. 2 and 3 are respectively plan views illustrating identification information portions of the information recording medium in an enlarged scale.

FIG. 2 shows a portion 6 in which preceding and succeeding tracks of identification information are connected at the groove portions and the land portions. FIG. 3 shows a portion 5 in which preceding and succeeding tracks are connected at the groove portions and the land portions, i.e. a portion in which the positions at which identification information is arrayed along the information tracks are different between the adjacent tracks but agree with the track advanced or delayed by two tracks. As shown in FIG. 2, identification information is disposed to be radial at a first position 21 and a second position 22 in the radius direction of the information recording medium. The preceding and succeeding tracks are connected to each other by the groove portion information tracks 3 and the land portion information tracks 4. In this illustrated example, each identification information corresponds to the recording area of the groove portion information track 3 on the right-hand side of FIG. 2. Further, identification information corresponding to the groove portion information track 3 on the right-hand side of FIG. 2 is placed at the first position 21, and identification information corresponding to the land portion information track 4 is placed at the second position 22. Specifically, the positions at which identification information is arrayed along the information tracks are different between the adjacent tracks but agree with the track which is advanced or delayed by two tracks.

The wobble signal is of a sine wave shape which begins with the same phase relative to all information tracks. The wobble signal starts immediately after the identification information portion or starts via a few buffer areas. With this arrangement, if points at which phases of the sine-wave wobble signal become zero degree are connected to each other by the adjacent tracks, then these points are arrayed to be radial so that the track width is never changed by the wobble signal. There is then presented no risk that the wobble signal will exert a bad influence upon the recording and reproducing characteristics. If the phases of the wobble signals are not made uniform in each track, then there is produced a portion in which the track width is modulated by the wobble signal, thereby resulting in the recording and reproducing characteristics being affected considerably. Therefore, as is evident from the above description of the present invention, in order to realize the present invention, it is very important to make the phases (including polarities) of the wobble signals uniform between the adjacent tracks.

In the track switching portion 5 shown in FIG. 3, the preceding and succeeding tracks of the identification information are connected to each other at the groove portion and the land portion. Also in this case, each identification information corresponds to the recording area of the information track on the right-hand side of FIG. 3. Identification information corresponding to the groove portion information track 3 on the right-hand side of FIG. 3 is placed at the first position 21, and identification information corresponding to the land portion information track 4 on the right-hand side of FIG. 3 is placed at the second position 22.

Therefore, when the beam spot 21 scans the land portion information track 4, for example, only one pit is constantly reproduced. There is then no risk that a crosstalk from the adjacent track will occur. Accordingly, it becomes possible to satisfactorily reproduce address information provided at the prepits without crosstalk. In this example, the address information provided at the prepits is recorded on the information recording medium by an 8/16 (eight-to-sixteen) modulation code (channel bit length is 0.2 μm). Accordingly, a shortest pit length is about 0.6 μm. From a standpoint of simplifying the configuration of the information recording and/or reproducing apparatus, the modulation code of the prepit portion and the modulation code of the user information recording portion should preferably be made the same. In this embodiment, the modulation code and the recording linear density are both made the same with the result that most of the circuit portions of the information recording and/or reproducing apparatus can be made common.

FIG. 4 is a perspective view illustrating the manner in which tracks and identification information according to this embodiment are configured, highlighting the manner in which identification information is formed by small concave portions (pits) 23.

In this embodiment, since the pits 23 are equally disposed on both sides of the track (the land portion or the groove portion), an influence exerted upon a tracking servo signal by the pits 23 is cancelled out so that a track offset can be suppressed to be sufficiently small. Further, when the land portion information track 4 is reproduced, the address information of the first prepit portion 21 and that of the second prepit portion 22 are reproduced continuously. Therefore, if information is disposed in such a fashion that both of address information are integrated as one address information, then it is possible to separately set address (track No.), i.e. identification information independently of the land portion information track 4 and the groove portion information track 3. Specifically, if the address information of the first prepit portion 21 and the address information of the second prepit portion 22 are reproduced continuously, then it becomes possible to discriminate the land portion information track 3 and the groove portion information track 4 from each other.

FIG. 6 concretely illustrates the example of the manner in which identification information is numbered, showing identification information of the recording area 11 and identification information of the recording area 12. In this example, information is recorded and/or reproduced while detection spots are relatively scanned from left to right of the information recording medium. As shown in FIG. 6, a groove portion information track k on the left-hand side is connected to a right-hand side land portion information track K+1. The left-hand side land portion information track K+1 is connected to this track after one circumference of the information recording medium. In this example, identification information of an information recording area 81 of the groove portion information track K is N−1+S where reference letter S denotes a sum of optical recording information units per circumference of the track. If the identification information portion 6 of this track is reproduced by the beam spot or the like, then N−1+2S is reproduced as identification information existing at the first position 21, and N−1+S is reproduced as identification information existing at the second position 22. In this case, if a smaller number is constantly used as a recording area No. in advance, then N−1+S is adopted as identification information of the information recording area 81 of this groove portion information track K. When the land portion information track K−1 is scanned, N−1 is adopted as the identification information existing at the first position 21 similarly. At the same time, by the identification information existing at the first position 21 or the identification information existing at the second position 22, it is possible to discriminate the groove portion information track 3 and the land portion information track 4 from each other.

When the information track placed at the track switching portion 5 is reproduced, the correspondence between the identification information and the recording area can be detected, and the groove portion information track 3 and the land portion information track 4 can be discriminated from each other in exactly the same manner as that described above. Therefore, by using this relationship, it is possible to switch the track polarities of the groove portion information track and the land portion information track.

While there are provided two sets of the first and second identification information portions as described above in this example, there may be provided a plurality of sets of identification information portions. If there are provided four sets of identification information portions, then the first and second prepit portions may be located on the lower side of the groove portion (inside of the radius direction), and the third and fourth prepit portions may be located on the upper side of the groove portion (outside of the radius direction). Alternatively, the first and third prepit portions may be located on the lower side of the groove portion, and the second and fourth prepit portions may be located on the upper side of the groove portion. The information recording medium can be made more resistant to the defects or the like and become highly-reliable by increasing the number of the prepit portions.

Here, a phase change type recording film (GeSbTe) was used as a recording film. Accordingly, a recording mark is produced in the form of an amorphous area.

EMBODIMENT 5: INFORMATION RECORDING AND/OR REPRODUCING METHOD

The manner in which information is recorded on and/or reproduced from the information recording medium of the embodiment 4 by the information recording and/or reproducing apparatus shown in FIG. 7 will be described below. As shown in FIG. 7, the information recording medium 8 according to the embodiment 4 is rotated by the motor 162. The light intensity control means 171 controls the light generating circuit 131 to generate the light 122 in such a way as to obtain a light intensity instructed by the central control circuit 151. The converging circuit 132 converges the light 122 to form the beam spot 7 on the information recording medium 8. The light 12 is detected by using the reflected light 123 from the beam spot 7 with the photo detecting circuit 133. The photo detecting circuit 133 comprises a plurality of split photo detectors. The wobble detecting circuit 191 reproduces information from the information recording medium 8 by using the reproduced signal 130 from the split photo detectors of the photo detecting circuit 133. When the wobble signal of the track on the information recording medium 8 is detected, there is used a differential output between the outputs from the split photo detectors of the photo detecting circuit 133. This utilizes the fact that an intensity distribution of diffracted light from the beam spot is changed depending upon a positional relationship between the beam spot and the track. On the basis of the wobble signal detected by the reproducing means 191, information indicative of the positional relationship between the beam spot and the track and prepit identification information, the position control circuit 161 controls the position of the converging circuit 132, and also controls the rotation frequency of the motor 162. In this case, the position control circuit 161 controls the rotation frequency of the motor 162 in such a manner that the frequency of the reproduced wobble signal becomes a previously-determined constant value. If the rotation frequency of the motor 162 is controlled by the position control circuit 161 as described above, then it is possible to automatically control the motor 162 independently of the zones on the information recording medium 8 so that the motor 162 can be rotated at a proper rotational speed. Also, since this rotation information has one cycle of about 37 $\mu$m, the rotation information is considerably high in density, and it becomes possible to control the rotation of the motor 162 with a high accuracy. Furthermore, since this rotation information is disposed all over one revolution of the disk, even when one portion of the rotation information is dropped out due to some causes such as smudges or defects, information can be satisfactorily reproduced from the information recording medium 8 highly reliably.

Figure 8:
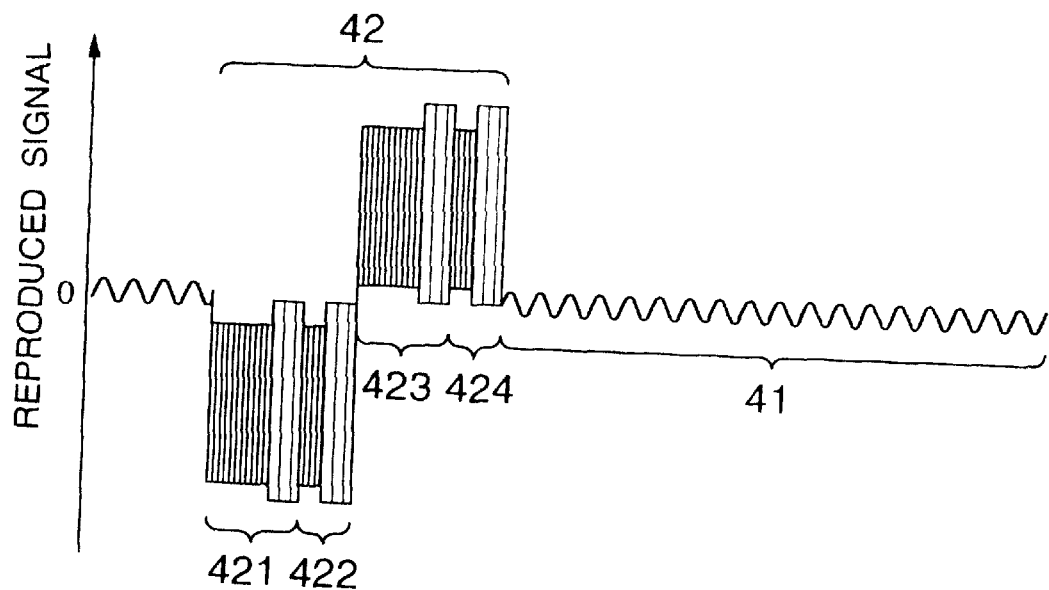
FIG. 8 is a diagram of a waveform of a reproduced signal obtained from the information recording medium according to the present invention.

FIG. 8 shows examples of a reproduced signal 41 of wobble information and a reproduced signal 42 of identification information portion. In this example, photo detectors which are split at least by a half in the radius direction are used as a detector, and there is obtained a differential signal between the outputs from the two split photo detectors. Specifically, there was used a detection system that is similar to a detection system of a push-pull signal used in an ordinary tracking control or the like. However, since the frequency of the wobble signal and the frequency of the identification information signal are higher than the band necessary for the tracking servo, there were prepared an amplifying apparatus and a differential circuit, both of which should be in accordance with the high frequency specification. There were obtained reproduced signals 421, 422, 423 and 424 in correspondence with the first, second, third and fourth identification information signals 21, 22, 23 and 24. When the beam spot 7 is not overlapping the prepit 23 of the identification information portion 2, reflected light is equally introduced into the above-mentioned split photo detectors so that a reproduced signal (differential signal) output is almost zero. Whereas, under the condition that the beam spot 7 partly overlaps the prepit 23 (see FIG. 2), a distribution of reflected light from the beam spot 7 is largely deviated due to a diffraction effect, and the outputs from the split photo detectors are unbalanced. As a consequence, there is obtained a large differential signal output. Inasmuch as the direction in which the distribution of reflected light is deviated at that time is different depending on the positional relationship between the beam spot and the pit, the differential output corresponding to the identification information portions 21, 22 and the differential output corresponding to the identification information portions 23, 24 are inverted in polarity. Accordingly, if this polarity of the differential outputs is used, then it is possible to determine any one of the groove portion information track and the land portion information track in which the beam spot is positioned. Identification information can be obtained when the resulting signal is converted into a binary signal and then decoded by a follow-up slice circuit (not shown). At that time, since error detection information is added to the identification information, it is possible to judge whether or not identification information is detected correctly. Hence, there can be used only correct identification information in a plurality of identification information.

The wobble signal is detected in a similar manner. Specifically, since the positional relationship between the beam spot and the groove is modulated by the wobbling signal, there is obtained a signal output 41 shown in FIG. 8. However, since an amplitude (track displacement amount: 20 nm) of a wobble signal is small relative to the displacement amount (about 0.3 $\mu$m) of identification information, the amplitude of the wobble signal becomes smaller in proportion thereto.

An example of the manner in which a timing signal (clock signal) is obtained from the wobble signal thus detected will be described with reference to FIGS. 10A through 10D.

Figure 10A:
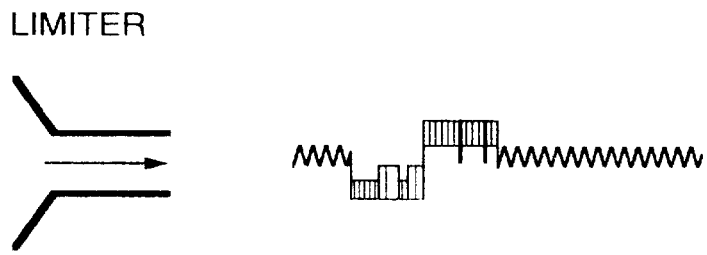
FIGS. 10A through 10D are respectively diagrams used to explain a recording and/or reproducing method using the information recording medium according to the present invention.
Figure 10B:
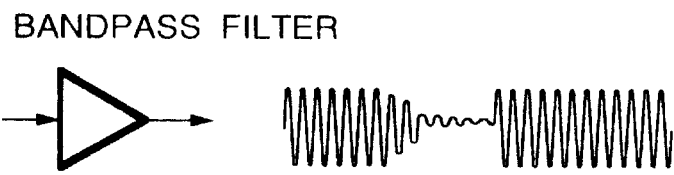
Figure 10C:
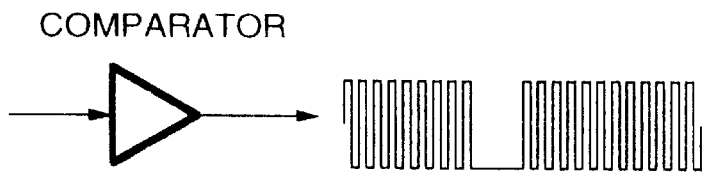
Figure 10D:
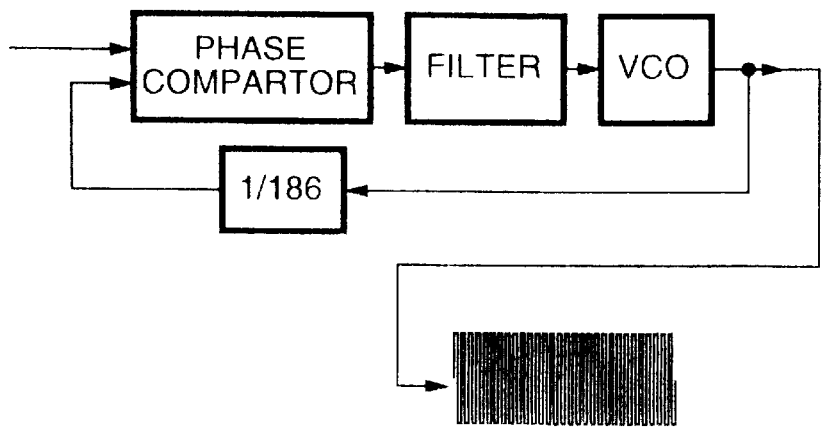

Initially, the reproduced signal 41 shown in FIG. 8 is supplied to a limiter circuit shown in FIG. 10A, in which an identification information is limited in amplitude. Then, by using the bandpass filter shown in FIG. 10B, only a signal having a component synchronized with the wobble signal is extracted from the reproduced signal. Then, the resulting signal is converted into a binary signal by a comparator shown in FIG. 10C, and eventually, there is obtained the clock signal by using a phase-locked loop (PLL) comprising a phase comparator, a filter circuit, a VCO (voltage-controlled oscillator) and a divide-by-186 circuit as shown in FIG. 10D. At that time, a filter characteristic used in the PLL is set to be sufficiently lower than the frequency corresponding to 11.2 wobble cycles in this example in such a manner that the clock signal may be prevented from being affected by a dropped-out portion (identification information portion) of the wobble signal. In this embodiment, since the frequency of the wobble signal becomes 160 kHz, the frequency band of the PLL is set to about 2 kHz. This frequency should preferably be set to be larger than a frequency (about 700 Hz) corresponding to the length of the recording unit from a standpoint of a high-speed accessing.

In this way, there was obtained the clock signal that was synchronized with the wobble signal. A method of recording and/or reproducing information on and/or from the information recording medium by using this clock signal and identification information will be described below.

Figure 9:
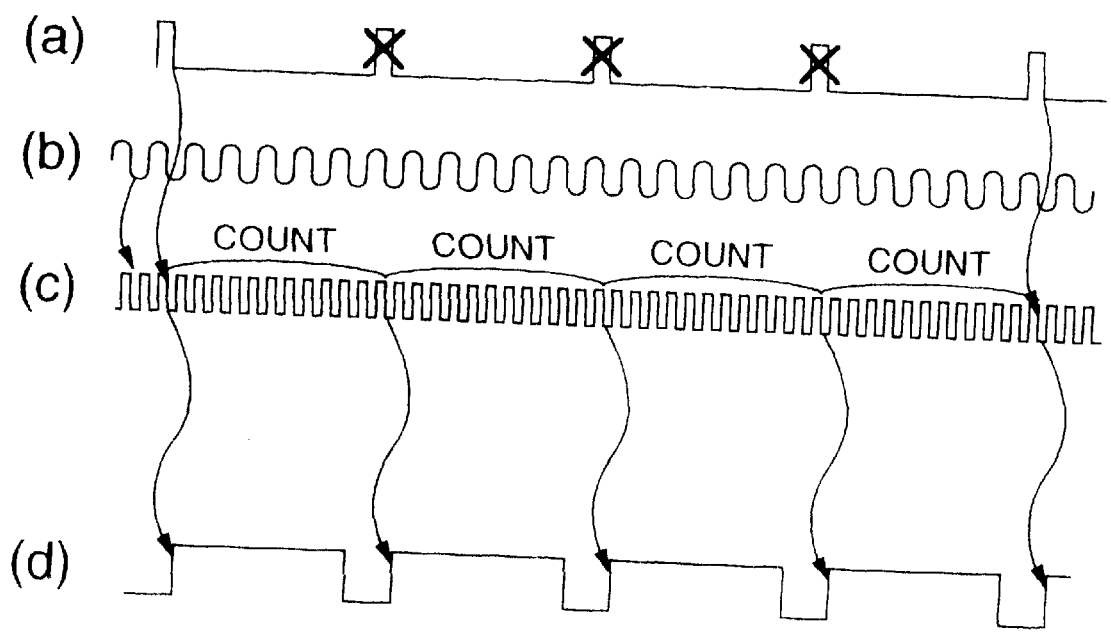
FIG. 9 is a diagram of a waveform of a signal that is used to record and/or reproduce the information recording medium according to the present invention.

FIG. 9 is a timing chart used to explain the manner in which information is recorded on and/or reproduced from the information recording medium. In FIG. 9, reference letters (a), (b), (c), and (d) denote an identification information detecting signal, a wobble signal, a clock signal, and a recording and reproducing timing signal, respectively. The identification information detecting signal is a signal indicating that identification information is detected normally. It is customary that the recording unit areas that should be recorded and/or reproduced are discriminated from each other based on this identification information detecting signal and that the recording and/or reproducing timing can be controlled. According to the present invention, when the identification information could not be normally detected as shown in FIG. 9 (crosses on (a) in FIG. 9 show that identification information could not be detected normally), it is possible to obtain the recording and reproducing timing signal instead of the identification information detecting signal by counting the clock signal obtained from the wobble signal based on the final identification information that was detected normally. According to this arrangement, even when identification information cannot be detected normally, there can be obtained the recording and reproducing timing signal. Also, since this recording and reproducing timing signal is generated from the wobble signal synchronized with the information recording medium, even if there is an error such as a rotational speed of the information recording medium, the recording and reproducing timing signal can be obtained accurately. Furthermore, even when a plurality of identification information cannot be detected continuously, there is no risk that errors will be accumulated. Therefore, it becomes possible to configure an information recording and/or reproducing apparatus which can greatly allow errors of identification information itself.

If the signal detected from the above-mentioned wobble signal and the identification information are combined as described above, then it becomes possible to identify the position of the beam spot at all positions on the disk. Thus, information can be recorded on and/or reproduced from the information recording medium highly reliably. With the above-mentioned advantage, even if the information recording medium is not inspected at al when the information recording medium is shipped, it becomes possible to maintain the recording and/or reproduction highly reliable, thereby making it possible to reduce the cost of the information recording medium considerably. Furthermore, since the information recording medium becomes very resistant to smudges, the information recording medium need not be protected from the smudges by some suitable means such as a case. Therefore, it becomes possible to provide an inexpensive information recording medium.

According to the aforementioned first to fifth embodiments of the present invention, since information can be recorded on and/or reproduced from the information recording medium highly reliably, even if the information recording medium is not inspected at all when the information recording media are shipped, a high reliability with which information is recorded on and/or reproduced from the information recording medium can be maintained, thereby making it possible to reduce the cost of the information recording medium considerably. Moreover, since the information recording medium according to the present invention becomes very resistant to smudges, the information recording medium need not be protected from the smudges by some suitable means such as a case. Therefore, it becomes possible to provide an inexpensive information recording medium.

Further, since the recording units are arrayed to be radial in the radius direction of the information recording medium, the tracks can be accessed with ease, and a crosstalk between position information of respective recording units can be suppressed to the minimum.

Moreover, since the recording units are disposed in such a manner that the lengths of the circular arc-shaped portions which are the recording units are made almost the same, a recording density becomes substantially uniform within the disk, and hence it becomes possible to use the whole surface of the disk efficiently.

Moreover, the starting point and the ending point of the recording unit can be reliably detected by using the wobble cycle, and it becomes possible to detect the accurate position in the recording unit. Also, since the length of the recording unit and the wobble cycle are perfectly synchronized with each other, by making the wobble frequency become constant, it is possible to automatically control the rotational speed of the information recording medium in such a fashion that the relative velocity of the information recording medium becomes almost constant.

Further, since it becomes easy to make the length of each recording unit on the information recording medium become constant, the length of the extra gaps on the information recording medium can be minimized.

Furthermore, since it is possible to record and/or reproduce information on and/or from the information recording medium while monitoring the displacement amount of the track, a reliability with which the positioning servo is effected can be improved greatly.

According to the present invention, since the identification information is provided at every recording unit and the position information can be reliably obtained from the recording portion owing to the wobbles of the groove portion and the land portion, the recorded information can be accessed reliably and the recording information can be positioned on the information recording medium with a high accuracy.

Having described preferred embodiments of the invention with reference to the accompanying drawings, it is to be understood that the invention is not limited to those precise embodiments and that various changes and modifications can be effected therein by one skilled in the art without departing from the spirit or scope of the invention as defined in the appended claims.

What is claimed is:

1. An information recording medium comprising:
   a disk-like substrate;
   a plurality of tracks extending in a circumferential direction on the disk-like substrate and associated with a plurality of grooves;
   a plurality of zones being provided on the disk-like substrate and extending between a first position and a second position in a radial direction of the disk-like substrate, each zone including at least two tracks;
   each track being divided into a plurality of recording units of circular arc shape extending in the circumferential direction, radially adjacent recording units of a respective zone being delimited by a pair of radial lines joined to form a central angle at an apex proximate to a center of the disk-like substrate, each recording unit of a respective zone being delimited by the same central angle and the recording units of different zones being delimited by different central angles, each recording unit having substantially the same length;
   wherein the grooves are wobbled in the radial direction of the disk-like substrate and the length of each recording unit is an integer multiple of a cycle of the wobble, the integer multiple being the same for the different zones.

2. An information recording medium according to claim 1, wherein radially adjacent grooves of a respective zone have the same wobbling phase.

3. An information recording medium according to claim 1, wherein one of the plurality of tracks is formed in one of the plurality of grooves.

4. An information recording medium according to claim 1, wherein a land is provided between radially adjacent grooves.

5. An information recording medium according to claim 4, wherein a track is formed on the land.

6. An information recording medium according to claim 5, wherein one of the plurality of tracks is formed in one of the plurality of grooves.

7. An information recording medium comprising:
   a disk-like substrate;
   a plurality of tracks extending in a circumferential direction on the disk-like substrate and associated with a plurality of grooves having a land between adjacent grooves;

a plurality of zones being provided on the disk-like substrate and extending between a first position and a second position in a radial direction of the disk-like substrate, each zone including at least two tracks;

each track being divided into a plurality of recording units of circular arc shape extending in the circumferential direction, radially adjacent recording units of a respective zone being delimited by a pair of radial lines joined to form a central angle at an apex proximate to a center of the disk-like substrate, each recording unit of a respective zone being delimited by the same central angle and the recording units of different zones being delimited by different central angles, each recording unit having substantially the same length;

wherein the grooves are wobbled in the radial direction of the disk-like substrate and the length of each recording unit is an integer multiple of a cycle of the wobble, the integer multiple being the same for the different zones.

8. An information recording medium according to claim 7, wherein radially adjacent grooves of a respective zone have the same wobbling phase.

9. An information recording medium according to claim 7, wherein one of the plurality of tracks is formed in one of the plurality of grooves.

10. An information recording medium according to claim 7, wherein a track is formed on the land.

11. An information recording medium according to claim 10, wherein one of the plurality of tracks is formed in one of the plurality of grooves.

12. An information recording medium according to claim 1, wherein identification information is disposed in the tracks at the head of each recording unit.

13. An information recording medium according to claim 12, wherein the identification information includes address information.

14. An information recording medium according to claim 7, wherein identification information is disposed in the track at the head of each recording unit.

15. An information recording medium according to claim 14, wherein the identification information includes address information.

* * * * *